United States Patent [19]

Gardiner et al.

[11] E Re. 30,477

[45] Reissued Jan. 13, 1981

[54] ELECTROPHOTOGRAPHIC LIQUID DEVELOPING SYSTEM

[75] Inventors: Kenneth W. Gardiner, Menlo Park; Louis F. Schaefer, Palo Alto, both of Calif.

[73] Assignee: Savin Corporation, Valhalla, N.Y.

[21] Appl. No.: 37,491

[22] Filed: May 10, 1979

Related U.S. Patent Documents

Reissue of:

[64] Patent No.: 3,981,267
Issued: Sep. 21, 1976
Appl. No.: 579,330
Filed: May 20, 1975

[51] Int. Cl.[3] ..... G03G 15/10

[52] U.S. Cl. ..... 118/689; 118/647; 355/10

[58] Field of Search ..... 118/689, 647, 648; 355/10, 14

[56] References Cited

U.S. PATENT DOCUMENTS

| | | | |
|---|---|---|---|
| 2,956,487 | 10/1960 | Giaimo, Jr. | 355/14 |
| 3,411,482 | 11/1968 | Brodie | 118/637 |
| 3,611,982 | 10/1971 | Coriale et al. | 118/637 |
| 3,674,532 | 7/1972 | Morse | 118/637 |
| 3,782,818 | 1/1974 | Smith | 355/10 |
| 3,815,989 | 6/1974 | Davis et al. | 118/637 |
| 3,860,436 | 1/1975 | Meagher | 118/637 |
| 3,892,481 | 7/1975 | Schaefer et al. | 355/10 |
| 4,052,127 | 10/1977 | Kuroishi et al. | 118/648 |

*Primary Examiner*—Ralph S. Kendall
*Attorney, Agent, or Firm*—Shenier & O'Connor

[57] ABSTRACT

An electrophotographic liquid developing system for overcoming the effect of photoconductor background potential in which during the passage of the image area through the developer unit a constant current source supplies a small current to the development electrode to raise the electrode to a potential of the same polarity as and of a magnitude greater by predetermined amount than that of the average background potential of the image area in a preferred embodiment the constant current source is provided by a small plate mounted in and insulated from the transfer corona housing and having such dimensions as to provide the required current. Preferably, the output of the constant current source is controlled in response to a measurement of the conductivity of the developer.

23 Claims, 8 Drawing Figures

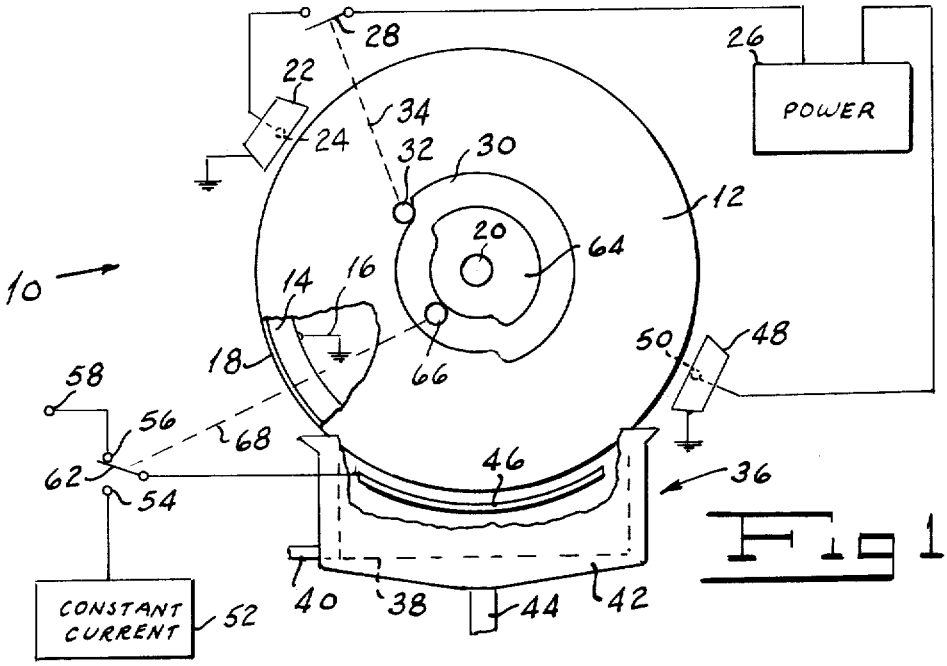
Fig 1
Fig 2
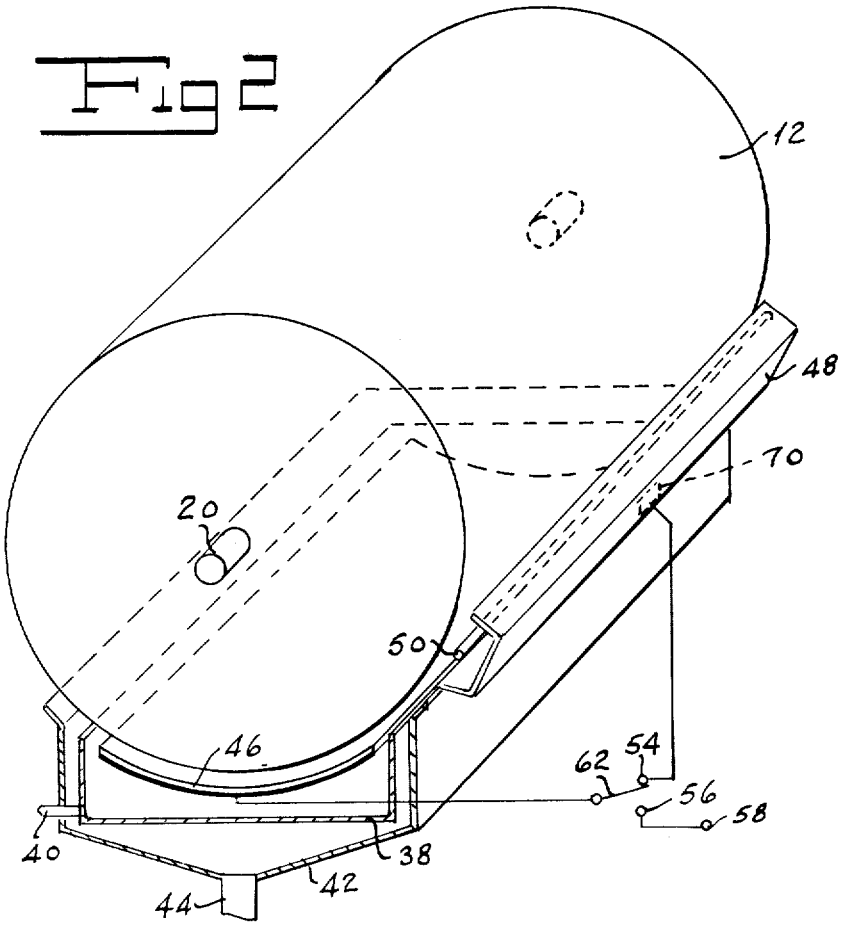

ELECTROPHOTOGRAPHIC LIQUID DEVELOPING SYSTEM

Matter enclosed in heavy brackets [ ] appears in the original patent but forms no part of this reissue specification; matter printed in italics indicates the additions made by reissue.

BACKGROUND OF THE INVENTION

One of the most significant problems in the field of present-day electrophotographic reproducing systems is that of background or residual potential in exposed or non-image areas of the photoconductor. As is known in the art, in the course of operation of an electrostatic reproducing machine, the surface of a photoconductor first is brought under the influence of a corona discharge system which applies a predetermined electrostatic charge over the surface. Next, the charged surface is exposed to an image of the original to cause the charge to leak off in exposed or non-image areas and to cause the charge to be retained in unexposed or image areas of the surface. The resultant latent electrostatic image is then subjected to the action of a developer which is made up of a carrier and suspended toner particles having a triboelectric charge of a polarity opposite to that of the charge on the photoconductor surface. Toner particles tend to adhere to those areas of the photoconductive surface which retain the charge thus to develop the image. In plain paper copying machines after the latent image has thus been developed, the image is transferred to a sheet of plain paper. In most instances, this is accomplished by means of a transfer corona system which is of the same polarity as that of the charging corona so that, when the sheet of paper passes between the transfer corona and the surface carrying the developed image, the toner particles are transferred from the photoconductive surface to the sheet of paper.

The problem of background potential arises from the fact that most photoconductive surfaces do not discharge completely in non-image areas when the machine in which they are installed is operated at a practicable rate of speed. Stated otherwise, if the photoconductive surface were subjected to the light image for a time sufficient to permit exposed or non-image areas to discharge fully, the machine would not operate at a speed sufficiently high for commercial use. Thus, in most machines, after the exposure step there remains in the exposed areas a residual charge. When the photoconductor is run through a developer system, toner particles tend to migrate toward the exposed areas under the influence of the residual charge so that the resultant copy is gray in non-image areas rather than being pure white as is desirable.

Various expedients have been suggested in the prior art for overcoming the problem of deposition of toner particles in background areas. One such arrangement is illustrated in our copending application Ser. No. 479,659, filed June 17, 1974, for Automatic Development Electrode Bias Control System. In the arrangement shown in that application, a floating electrode insulated from ground assumes a potential which is equal to the average potential across the latent image. This floating electrode potential is used to control the operation of a biasing circuit which applies a biasing potential to a development electrode which potential is of the same polarity as that of the image and is of a magnitude sufficient to overcome the effect of the residual or background potential. While the arrangement shown in the Schaefer et al. application successfully overcomes the problem of toner deposition in background areas, it is relatively expensive for the result achieved thereby. That is to say, that while it is eminently suitable for use in a relatively sophisticated machine, the cost of which warrants its inclusion, it is not suitable for inclusion in a relatively inexpensive machine.

We have developed an electrophotographic liquid developing system which overcomes the problem of toner deposition in background areas. Our system is simpler in construction than are systems of the prior art intended to achieve the same purpose. It is considerably less expensive to produce than are systems of the prior art. It permits of cleaning of the developer electrode in a relatively simple manner. Its operation is not appreciably affected by changes in the average potential of the photoconductor.

SUMMARY OF THE INVENTION

One object of our invention is to provide an electrophotographic liquid developing system which overcomes the effect of residual or background potential.

Another object of our invention is to provide an electrophotographic liquid developing system which overcomes the effect of background potential in a simpler manner than do systems of the prior art intended to achieve the same purpose.

A further object of our invention is to provide an electrophotographic liquid developing system which overcomes the effect of background potential and which is inexpensive to construct.

Yet another object of our invention is to provide an electrophotographic liquid developing system which overcomes the effect of background potential and which is not appreciably affected by changes in the average voltage on the photoconductor with which it is used.

Still another object of our invention is to provide an electrophotographic liquid developer system which permits of the cleaning of the development electrode in a relatively simple manner.

Other and further objects of our invention will appear from the following description.

In general, our invention contemplates the provision of an electrophotographic liquid developing system in which we connect the development electrode to a constant current source which provides a small constant current of a magnitude sufficient to maintain the development electrode at a potential of the same polarity as that of the image and of a magnitude greater by a predetermined amount than the magnitude of the average potential on the drum. In a preferred embodiment of our invention, the constant current source is provided by a small plate located within the transfer corona housing and insulated therefrom and having dimensions which are predetermined to provide the desired low constant current. Further, preferably we sense the conductivity of the developer liquid and, in response thereto, control the constant current source to account for variations in conductivity of the development liquid.

BRIEF DESCRIPTION OF THE DRAWINGS

In the accompanying drawings to which reference is made in the instant specification and in which like reference characters are used to indicate like parts in the various views.

FIG. 1 is an end elevation of an electrostatic copying machine provided with our electrophotographic liquid developing system with parts broken away.

FIG. 2 is a perspective view of a portion of an electrostatic copying machine provided with one form of our electrophotographic liquid developing system.

DESCRIPTION OF THE PREFERRED EMBODIMENTS

Figure 3:
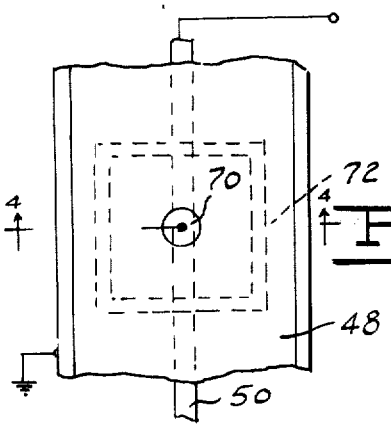
FIG. 3 is a fragmentary view illustrating one form of constant current source which we may employ in our electrophotographic liquid developing system.

Referring now to FIG. 1 of the drawings, a machine indicated generally by the reference character 10 which may be provided with our developing system to be described more fully hereinbelow includes a drum 12 comprising a conductive shell 14 connected to ground by a lead 16 and a layer 18 of photoconductive material. Shafts 20 support the drum 12 for movement in a direction successively to move the surface past a plurality of stations at the first of which the surface is provided with a uniform electrostatic charge. The corona at the first station includes a housing 22 connected to ground and a corona discharge wire 24 adapted to be connected to a suitable source of power by a switch 28. It will readily be appreciated by those skilled in the art that the source 26 of power provides the corona wire 22 with a potential such as to charge the surface of layer 18 with a plurality which is opposite to that assumed by the triboelectric toner particles of the developer. If these particles assume a positive charge, then the surface of layer 18 is charged negatively. Alternatively, if the particles are such that they assume a negative charge, then the corona wire 24 charges surface layer 18 positively.

The operation of the corona charger system is under the control of a cam 30 carried by shaft 20 for rotation therewith. A follower 32 in engagement with the surface of cam 30 is adapted to close switch 28 through a linkage 34 for a period of time sufficient to charge the image area of the surface of layer 18.

As the surface of layer 18 leaves the corona charger with the with the drum 12 moving in a counterclockwise direction as viewed in FIG. 1, the uniformly charged surface is subjected to an image of the original to be reproduced. The exposure system for accomplishing this result is not shown since it per se forms no part of our invention. After having been subjected to a light image of the original to be reproduced, the surface of layer 18 carries a latent electrostatic image. That is to say, exposure of the surface to the image causes the charge in background or non-image areas to leak off while the charge in image or unexposed areas is retained.

Following the production of the latent electrostatic image on the surface of layer 18, as the drum moves in a counterclockwise direction, the portion of the surface carrying the image passes through a developer system indicated generally by the reference character 36. Developer system 36 includes an applicator tray 38 to which a suitable liquid developer is supplied through a conduit 40. As is known in the art, the developer liquid is made up of a light hydrocarbon carrier liquid in which there are suspended particles of toner which assume a positive or negative triboelectric charge depending upon the material of which the particles are made. Developer liquid supplied to the tray 38 is brought into intimate contact with the surface of layer 18 and overflows from the tray into a collector trough 42 from which the overflow liquid is carried through a pipe 44 back to the developer supply system (not shown).

Our developer system includes a developer electrode 46 which, in a manner to be described more fully hereinbelow, is maintained at a potential of the same polarity as that to which the surface of layer 18 is charged and of a magnitude greater by a predetermined amount that the average potential across the latent image.

In one form of electrostatic copying machine, the developed image leaving the developer system 36 passes by a transfer corona system including a housing 48 connected to ground and a corona wire 50 connected to the source 26. At this transfer station, a sheet or length of material (not shown), such as ordinary paper, to which the image is to be transferred passes between the corona wire 50 and the surface of layer 18. Source 26 applies to the wire 50 a potential of the same polarity as that which is applied to the charging wire 24. Under the influence of the corona produced by wire 50, the developed image migrates from the surface of the drum 12 onto the surface to the paper adjacent to the drum. In the form of machine illustrated in FIG. 1, the transfer corona including the wire 50 is on during the entire period of time for which the machine is in operation.

As has been pointed out hereinabove, in development systems which have heretofore been devised, a biasing potential is applied to the electrode 46 in an effort to overcome the effect of residual potential in background areas of the image. Moreover, as is pointed out hereinabove, these systems are relatively complex in that a sensing electrode or an electrometer or the like is employed to sense the average potential across the image which sense potential is used to control the voltage applied to one or more development electrodes. It has also been suggested that a fixed voltage source be employed to provide a biasing potential.

We have discovered that, in the the vast majority of cases, if the development electrode 46 is maintained at a potential greater by a predetermined amount than an assumed average potential in the image area on the layer 18, the effect of residual potential in background areas of the image is effectively overcome, without the necessity of sensing the surface potential. For example, where the average potential in the image area on the drum is assumed to be minus 100 volts, if the electrode 46 is maintained at a potential of minus 175 volts, substantially no deposition of toner in non-image areas results. We have found, moreover, that this can most expeditiously and effectively be achieved by the application of a constant current of predetermined magnitude to the electrode 46. To this end, our system includes a constant current source which, as is known in the art, puts out a constant current irrespective of variations in the load. In a practical embodiment, using the single development electrode 46 illustrated in FIG. 1, we have found that a constant current source 52 which puts out a current of around two microamperes is sufficient to raise the potential of the electrode 46 to one which is about 75 volts greater than that of the average potential of the latent image on the layer 18 of drum 12.

In our arrangement, electrode 46 is connected to the arm 62 of a single-pole, double-throw switch including a contact 54 which is connected to the output of the constant current source 52 and a contact 56 which is connected to a suitable source 58 of cleaning potential. Switch contact arm 62 is under the control of a cam 64 which may, for example, be mounted on shaft 20 for rotation therewith. Cam 64 is so shaped as to actuate a follower 66 to move arm 62 from contact 56 into engagement with contact 54 as the latent image enters the developer applicator's system 36. After the image has passed through the developer system, arm 62 returns to the terminal 56 carrying the cleaning potential. As has been explained hereinabove, the constant current source 52 is such as to cause the electrode 46 to be at a potential which is of the same polarity as is that of the latent image and of a magnitude greater by a predetermined amount. The cleaning potential at terminal 58 is of a polarity opposite to that of the biasing potential and the image potential so as to insure that any toner particles which may have collected on the developer electrode 46 are returned into the liquid developer after development of the image.

Referring now to FIG. 2, in one embodiment of our invention, we obtain the small constant current required to produce the biasing potential by placing a small plate 70 in the charger corona housing 48 and insulated therefrom. The dimensions of the plate 70 are carefully selected to insure that the plate collects a current of the proper magnitude of, for example, two microamps to produce the required biasing potential. In a specific embodiment in which a potential of, for example, 6.3 KV if applied to the transfer corona wire 50 to initiate the corona discharge, a plate 70 having an area of about one centimeter square placed in and insulated from the housing 48 results in a current of about two microamperes which, when applied to the biasing electrode 46, causes this electrode to assume a potential which is greater by about 75 volts than is the average drum potential.

Our constant current source 52 has a number of advantages as the means for raising the electrode 46 to a predetermined potential above the average potential of the image area on the drum 18. One distinct advantage is that the "offset" voltage or the voltage by which the electrode 46 exceeds the average potential on the drum 18 is not appreciably affected by changes in the potential on the surface of the layer 18. This readily apparent when we consider that, once developer has been supplied to the tray 38 so as to fill the space between the electrode 46 and the drum 12, the resistance between the electrode 46 and the surface of layer 18 is substantially fixed. Even if the potential of the surface of layer 18 changes, owing to the fact that the source 52 supplies a constant current to the electrode 46, the voltage drop across the developer liquid between the electrode and the surface of the drum will remain substantially the same.

Figure 4:
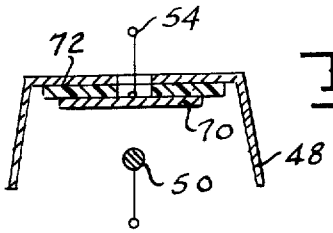
FIG. 4 is a sectional view of the constant current source illustrated in FIG. 3 taken along the line 4—4 of FIG. 3.

Referring now to FIGS. 3 and 4, we have illustrated in somewhat greater detail the arrangement of the small conductive plate 70 which we employ as a current source. In the arrangement shown, plate 70 is positioned generally centrally of the housing 48 and is insulated from the housing by a layer 72 of any suitable insulating material. Contact with the plate 70 is made through aligned holes in the housing 48 and in the insulating layer 72. As is pointed out hereinabove, in a particular embodiment, the area of electrode 70 is approximately one square centimeter so as to produce a current of approximately two microamperes.

Figure 5:
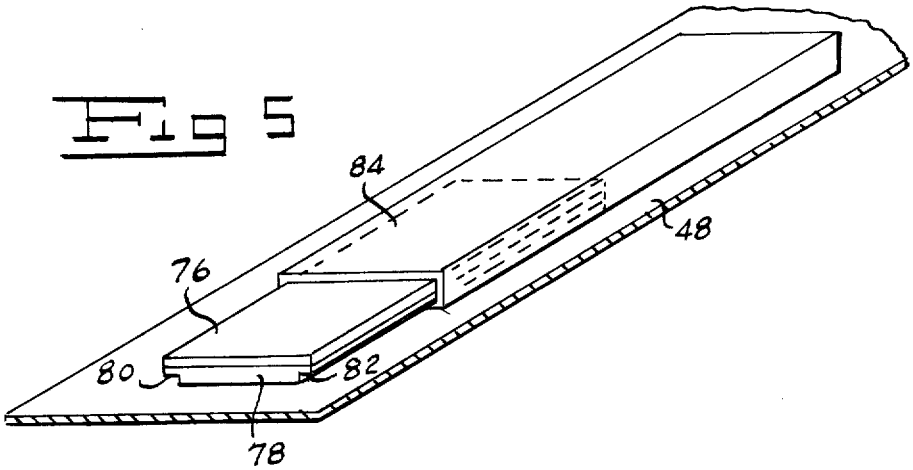
FIG. 5 is a fragmentary perspective view of a modified form of constant current source which we may employ in our electrophotographic liquid developing system.

Referring to FIG. 5, we have illustrated an alternate embodiment of the constant current source in which the current is derived from the transfer corona for example. In this embodiment, a relatively elongated strip 78 of insulating material is formed with a pair of runners 80 and 82 at the sides thereof. Runners 80 and 82 were adapted to cooperate with inwardly directed lips along the bottom edge of a cover 84 of insulating material. The plate 76 is supported on the strip 78 of insulating material. The area of the plate 76 which is exposed to the corona can be adjusted by adjusting the position of the cover 84 along the length of the plate 76. It will readily be appreciated that this arrangement permits us to vary the current provided by the plate 76. That is, if cover 84 is adjusted to a position at which a lesser area of plate 76 is exposed to the corona, the output current of the constant current source will be reduced. Alternatively, if the cover 84 is moved to a position at which a greater area of plate 76 is exposed to the corona, the output of the constant current source will increase.

Figure 6:
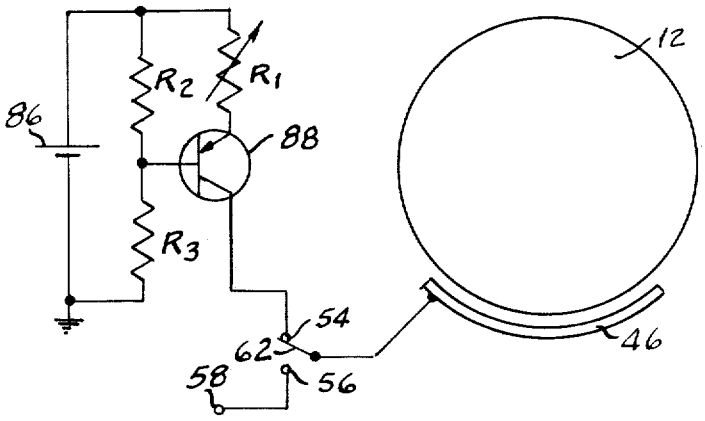
FIG. 6 is a schematic view illustrating an alternate embodiment of constant current source which we may employ in our electrophotographic liquid developing system

Referring now to FIG. 6, we have shown an alternate embodiment of a constant current source which may be employed to provide a constant current of the proper magnitude to the electrode 46 to raise the potential thereof to one which is greater in magnitude by a predetermined amount than that of the average potential on the surface of the drum 12. In this embodiment, we connect a pair of voltage dividing resistors R2 and R3 across a source of positive potential schematically indicated by the battery 86 in FIG. 6. A variable resistor R1 applies the voltage across R2 to the emitter to base terminals of a p-n-p transistor 88 to cause the collector of the transistor to provide a constant current of a sufficient magnitude to raise the potential of electrode 46 to the desired potential. It will readily be appreciated by those in the art that the magnitude of the source 86 must be appreciably greater than is the potential to which the electrode 46 may be raised. Further, the output of the transistor 88 may be changed by varying the transistor R1. By way of example, in the illustrated circuit to provide a collector current of two microamperes, we may select a d.c. source of 260 volts and resistors R2 and R3 of respective magnitude of 1 megohm and 25 megohms. Thus, 10 volts is applied between the terminal of R1 remote from the emitter of transistor 88 and the transistor base. Assuming a drop of 0.6 volts across the transistor 88, 9.4 volts appears across R1. Uner these conditions, in order for two microamperes to flow in the collector circuit, R1 will have a value of 4.7 megohms.

In the arrangement illustrated in FIG. 6, it will be appreciated that both the image potential and the potential on the electrode 46 are of a positive polarity indicating that negatively charged triboelectric particles are used in the developer of the system. Where positively charged triboelectric particles are employed in the developer, the image area of the drum 12 will be negatively charged and it becomes necessary to raise the electrode 46, to a negative voltage of a magnitude greater than that of the average image area negative potential on the drum 12. In this case, the circuitive FIG. 6 can readily be modified to provide a current in the proper direction. This is readily achieved by reversing the terminals of the source 86 and by employing a n-p-n transistor.

Figure 7:
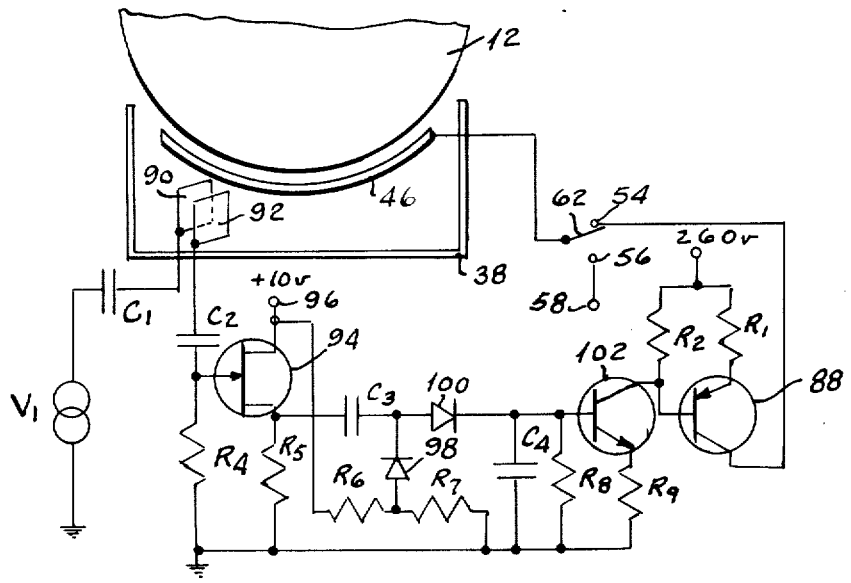
FIG. 7 is a schematic view illustrating a form of our electrophotographic liquid developing system which compensates for variations in conductivity of the developing liquid.

Referring now to FIG. 7, we have illustrated a further form of our system in which we regulate the output of the constant current source in response to changes in the conductivity of the developer liquid. To afford a measure of the conductivity of the developer liquid, we place a pair of conductive plates 90 and 92 in spaced relationship in the tray 38 so that the developer liquid flows into the space between the plates. We apply a small alternating current signal from a source VI to a series circuit including capacitor C1, plates 90 and 92, capacitor C2 and a resistor R4. The voltage V1 may, for example, be a sine wave of 12 volts. Capacitors C1 and C2 prevent direct current potentials from reaching the plates 90 and 92 so as to inhibit deposition of toner particles thereon. We so choose the value of R4 that the resistance between the plates 90 and 92 is at least a few times larger than R4. The resistance between the plates, of course, is a function of the plate area, plate to plate spacing and toner conductivity. Under these conditions, to a reasonable approximation, the voltage appearing across R4 is equal to V1 times R4 times the plate-to-plate conductance of plates 90 and 92, which voltage is proportional to the conductivity of the developer. We apply this alternating current signal which appears across R4 to the gate of a FET source follower, the drain of which is connected to a terminal 96 at a potential of about 10 volts and the source of which is connected by resistor R5 to ground. This source follower 94 has a high input impedance, a low output impedance and a gain of nearly one. It functions to isolate rectifier loading from R4. A capacitor C3, connected to the source terminal of FET 94, together with a pair of diodes 98 and 100 and a capacitor C4 form a peak-to-peak detector or voltage doubling rectifier circuit. Resistors R7 and R8 in the circuit account for various diode drops so that the current in R1 can approach zero when the toner conductivity approaches zero.

We apply the voltage across resistor R8 to the base of an n-p-n transistor 102, the collector of which is connected to a source of potential of 260 volts through R2 and the emitter of which is connected to ground by a resistor R9, thus to convert the voltage across R8 to a current. It will be appreciated that resistor R2 and the combination of transistor 102 and R9 form a voltage dividing means for biasing the base of transistor 88. The collector of transistor 102 is connected to the base of transistor 88, the center of which is connected to a source of plus 260 volts by a resistor R1 and the collector of which provides the required constant current. It will readily be appreciated that, if the conductivity of the developer drops, then the constant current output of transistor 88 decreases. Conversely, if the conductivity of the developer increases, the constant current output of transistor 88 increases Referring now to FIG. 8, we have shown as further form of our system in which the plate 70 provides the constant current source and in which a portion of the current from the plate is diverted from the electrode 46 in response to a change in the conductivity of the developer. In the arrangement illustrated in FIG. 8, the voltage across resistor R9 is developed in the same manner as in the arrangement illustrated in FIG. 7.

Figure 8:
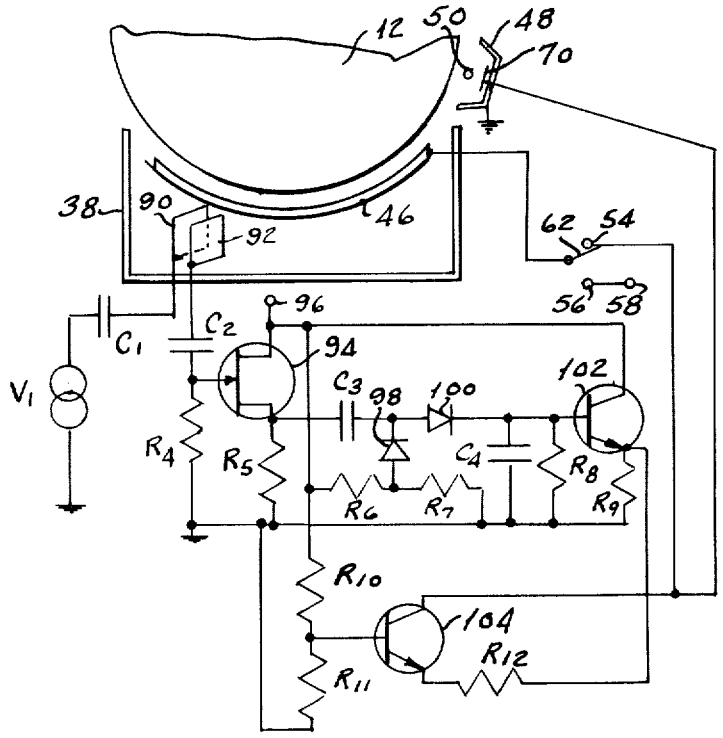
FIG. 8 is a schematic view illustrating another form of our electrophotographic liquid developing system which compensates for changes in conductivity of the developing liquid.

In the circuit shown in FIG. 8, we apply the potential at terminal 96 to a voltage divider including resistors R10 and R11, the common terminal of which is connected to the base of an n-p-n transistor 104, the emitter of which is connected to the emitter of transistor 102 by a resistor R12. We connect the collector of transistor 104 to the lead from the plate 70.

In the arrangement illustrated in FIG. 8, as the toner conductivity increases, the voltage across resistor R9 increases and the voltage across R12 decreases since the emitter of transistor 104 is biased to a potential above that of the emitter of transistor 102. The current through resistor R12 flows through transistor 104 and thus diverts part of the corona constant current from plate 70. As the conductivity of the developer increases, the current through transistor 104 decreases, thus increasing the current supplied to electrode 46 from terminal 54. In this manner, we compensate for variations in conductivity of the developer.

In operation of all forms of our arrangement, as the latent image on the surface of layer 18 enters the developer system 36, switch arm 62 moves from contact 56 to contact 54 under the action of cam 64 and follower 66. When this occurs, a predetermined current is supplied to electrode 46 to cause it to rise to a potential which is of the same polarity as and of a greater magnitude than the average potential in the image area of the surface of layer 18. By way of example, we have discovered that in most instances a current of about 2 microamperes will raise the potential of the electrode 46 to one of a magnitude which is approximately 75 volts greater than that of the average potential in the image area. Moreover, under most conditions, this potential is sufficient to prevent deposition of toner particles in background areas of the image. Preferably, we derive our constant current from the small plate 70 disposed in the transfer corona housing and insulated therefrom. We have discovered that a plate 70, having a surface area of approximately one square centimeter, provides the required current of about 2 microamperes. After the developed image leaves the developing system 36, switch arm 62 is permitted to return to contact 56 to apply a suitable cleaning potential to the electrode 46. As has been explained hereinabove, this potential is of the opposite polarity to that of the charge applied to the drum.

In operation of each of the forms of our system illustrated in FIGS. 7 and 8, the current provided by the constant current source is regulated in accordance with the changes in the conductivity of the developer liquid.

It will be seen that we have accomplished the object of our invention. We have provided a development electrode biasing system which is extremely simple in construction and in operation. It is inexpensive to manufacture. It requires only a single-pole, double-throw switch to accomplish both the biasing and cleaning. A preferred form of our system incorporates means for varying the current supplied by the constant current source in response to changes in developer conductivity. The offset voltage provided by our biasing system is substantially independent of variations in the average potential over the image area.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for developing a latent electrostatic image carried by the surface of a photoconductor having a residual potential in background areas of said image including in combination, means for applying developer to said surface at a developing station, a development electrode at said station, *and means for applying a constant biasing current to the development electrode, said biasing means including* a constant current source *providing a relatively small current* , and means for connecting said constant current source to said electrode to overcome the effect of said residual potential, *the biasing means being so constructed that the resistive impedance thereof seen by the electrode is extremely high.*

2. Apparatus as in claim 1 in which [the magnitude of] said [constant] current [source] is such as to raise the *unbiased* potential of said electrode to a *biased* potential [of a magnitude] *which is* greater by a predetermined *and relatively small* amount than the average potential of said latent image.

3. Apparatus as in claim 1 in which said constant current source comprises means for generating a corona discharge and a *relatively* small plate of conductive material subjected to said corona discharge to provide said constant current.

4. Apparatus as in claim 3 in which said plate has a surface area of about one square centimeter exposed to said corona discharge.

5. Apparatus as in claim 1 in which said constant current source comprises means for generating a corona discharge and a plate positioned with a surface thereof exposed to said corona discharge and means for varying the area of said plate surface exposed to said corona.

6. Apparatus as in claim 5 in which said area varying means comprises a plate of insulating material mounted for movement over said surface.

7. Apparatus as in claim 1 in which said constant current source provides a current of about two microamperes.

8. Apparatus as in claim 1 in which said constant current source comprises a source of potential having a magnitude appreciably greater than that to which said electrode is to be raised, a transistor, a voltage divider connected across said source for applying a biasing potential to the base of said transistor, a resistor connecting the emitter of said transistor to said source, the ratio of said voltage divider and the magnitude of said resistor being such as to cause the collector current of said transistor to be of a magnitude sufficient to raise the potential of said development electrode to a magnitude sufficiently great to overcome the effect of said biasing potential, and means for connecting the collector of said transistor to said development electrode.

9. Apparatus as in claim 8 in which said resistor is variable to permit adjustment of the collector current of said transistor.

10. Apparatus for developing a latent electrostatic image carried by the surface of a photoconductor having a residual potential in background areas of said image including in combination, a developer applicator tray for holding a supply of liquid developer, means for moving said surface relative to said tray to bring said developed liquid into contact with said image, a development electrode disposed within said tray, a constant current source, means connecting said constant current source to said development electrode, means for measuring the conductivity of developer liquid in said tray and means responsive to said measuring means for regulating said constant current source.

11. Apparatus as in claim 10 in which said regulating means decreases the output of said constant current source in response to a decrease in the conductivity of said developer.

12. Apparatus as in claim 10 in which said constant current source comprises means for generating a corona discharge and a small plate exposed to said corona discharge to pick up said constant current under the influence of said corona discharge.

13. Apparatus as in claim 12 in which said regulating means comprises means for diverting a portion of the current picked up by said plate.

14. Apparatus as in claim 10 in which said measuring means comprises a pair of conductive plates, means mounting said plates in spaced relationship in said developer liquid and means for applying an alternating current signal to said plates.

15. Apparatus as in claim 14 in which said measuring means comprises means connecting said plates to a resistor in a voltage divider circuit, said alternating current signal being applied to said circuit to develop a voltage across said resistor as a measure of the conductivity of said developer liquid and means responsive to said voltage for regulating said constant current.

16. Apparatus as in claim 15 including means for isolating said plates from direct current potentials.

17. Apparatus as in claim 10 in which said constant current source includes a source of potential of a magnitude substantially greater than that to which said electrode is to be raised, a transistor, voltage dividing means for applying a biasing potential to the base of said transistor and a resistor for connecting the emitter of said transistor to said source, the ratio of said voltage dividing means and the magnitude of said resistor being such as to cause the collector current of said transistor to be sufficiently high to raise the potential of said electrode sufficiently above the average image area of said photoconductor surface to overcome the effect of said background potential and in which said means for regulating said current comprises means for varying the ratio of said voltage dividing means.

18. Apparatus as in claim 10 in which said measuring means comprises a pair of conductive plates, means mounting said plates in spaced relationship in said developer liquid, means connecting said plates to a first resistor in a first voltage dividing circuit, means for applying an alternating current signal to said first voltage dividing circuit to develop a voltage across said resistor as a measure of the conductivity of said liquid, and in which said constant current source comprises a source of potential appreciably greater than that to which said electrode is to be raised, a transistor, second voltage dividing means connected to said source for applying a biasing potential to the base of said transistor, a second resistor connecting the emitter of said transistor to said source, the value of said second resistor and the ratio of said second voltage dividing means being such as to cause the collector of said transistor to carry a predetermined current and in which said regulating means comprises means responsive to said first resistor voltage for varying the effective ratio of the second voltage dividing means.

19. Apparatus as in claim 10 in which said measuring means comprises a pair of conducting plates means mounting said plates in spaced relationship in said developing liquid, means connecting said plates to a resistor in a voltage dividing circuit, means for applying an alternating current signal across said voltage dividing circuit to produce a voltage across said resistor which is a measure of the conductivity of said developer liquid, and in which said constant current source comprises means for producing a corona discharge and a small third plate exposed to said corona discharge to produce a predetermined current and in which said regulating means including means responsive to the voltage across said resistor for diverging a portion of said small third plate current from said electrode.

20. Apparatus as in claim 1 in which said constant current source produces a bias potential on said electrode of the same polarity as said residual potential, said apparatus including means for applying a reverse bias potential between said electrode and said photoconductor.

21. Apparatus as in claim 20 in which said reverse bias potential applying means comprises a source of potential of a polarity opposite to that of said residual potential and means for applying said opposite polarity potential to said electrode.

22. Apparatus as in claim 21 in which said means for connecting said constant current source to said electrode and said means for applying said opposite polarity potential to said electrode comprises a single pole double throw switch having a pair of contacts and a contact arm adapted selectively to be moved into engagement with said contacts, means connecting one of said terminals to said constant current source and the other of said terminals to said source of opposite polarity potential.

23. Apparatus as in claim 22 including a shaft driven in the course of operation of said machine, a cam on said shaft, a follower cooperating with said cam and means connecting said follower to said contact arm.

* * * * *

UNITED STATES PATENT AND TRADEMARK OFFICE

CERTIFICATE OF CORRECTION

PATENT NO. : RE. 30,477

DATED : January 13, 1981

INVENTOR(S) : Kenneth W. Gardiner and Louis F. Schaefer

It is certified that error appears in the above-identified patent and that said Letters Patent are hereby corrected as shown below:

Column 10, line 3, "developed" should read

-- developer --.

Column 11, line 16, "including" should be -- includes --;

line 17, "diverging" should be -- diverting --.

Signed and Sealed this

*Twenty-first* Day of *April 1981*

[SEAL]

*Attest:*

RENE D. TEGTMEYER

*Attesting Officer* *Acting Commissioner of Patents and Trademarks*